(12) United States Patent
Yu

(10) Patent No.: US 9,851,009 B2
(45) Date of Patent: Dec. 26, 2017

(54) GASKET

(71) Applicant: NOK CORPORATION, Tokyo (JP)

(72) Inventor: Nan Yu, Aso (JP)

(73) Assignee: NOK Corporation (JP)

( * ) Notice: Subject to any disclaimer, the term of this patent is extended or adjusted under 35 U.S.C. 154(b) by 0 days.

(21) Appl. No.: 15/323,044

(22) PCT Filed: Jun. 16, 2015

(86) PCT No.: PCT/JP2015/067225
§ 371 (c)(1),
(2) Date: Dec. 29, 2016

(87) PCT Pub. No.: WO2016/006393
PCT Pub. Date: Jan. 14, 2016

(65) Prior Publication Data
US 2017/0138480 A1    May 18, 2017

(30) Foreign Application Priority Data

Jul. 7, 2014    (JP) .................................. 2014-139554

(51) Int. Cl.
*F16J 15/06*    (2006.01)
*F16J 15/10*    (2006.01)

(52) U.S. Cl.
CPC .................... *F16J 15/104* (2013.01)

(58) Field of Classification Search
CPC  F16J 15/02; F16J 15/021; F16J 15/022; F16J 15/06; F16J 15/061; F16J 15/10; F16J 15/104; F16J 15/106
See application file for complete search history.

(56) References Cited

U.S. PATENT DOCUMENTS 5,031,924 A * 7/1991 Beatenbough ......... F16J 15/061
                                                        165/173
5,076,557 A * 12/1991 Beatenbough ......... F16J 15/061
                                                        165/173
(Continued)

FOREIGN PATENT DOCUMENTS

CN    1884874 A    12/2006
JP    2004-204941 A    7/2004
(Continued)

OTHER PUBLICATIONS

Extended European Search Report for Patent Application No. EP15819153.6 dated Jun. 23, 2017 (6 pages).

*Primary Examiner* — Gilbert Lee
(74) *Attorney, Agent, or Firm* — Harness, Dickey & Pierce, P.L.C.

(57) ABSTRACT

In a gasket which is installed to an installation groove provided in one member of two members facing to each other and comes into close contact with the other member, and has a seal projection coming into contact with a groove side surface of the installation groove, and provided over a whole periphery of the gasket in a side surface of the gasket, a concavity is provided in a part on a circumference of the gasket in the side surface of the gasket, for venting air when the gasket is installed to the installation groove. The concavity is formed into a shape having a predetermined curvature in a longitudinal direction of the gasket. The gasket can prevent the pressing resistance at a time of installing the gasket from being enlarged, and prevent the gasket from floating up from the installation groove due to the spring back of the sealed air.

2 Claims, 4 Drawing Sheets

(56) References Cited

U.S. PATENT DOCUMENTS

| | | | |
|---|---|---|---|
| 2011/0193298 A1* | 8/2011 | Yoshitsune | F16J 15/061 277/648 |
| 2014/0197606 A1* | 7/2014 | Jeanne | F16J 15/024 277/644 |
| 2014/0217680 A1* | 8/2014 | Mori | F16J 15/024 277/594 |
| 2015/0233475 A1* | 8/2015 | Yu | F16J 15/104 277/590 |

FOREIGN PATENT DOCUMENTS

| | | |
|---|---|---|
| JP | 2013040673 A | 2/2013 |
| JP | 2013044401 A | 3/2013 |
| JP | 2014105784 A | 6/2014 |

\* cited by examiner

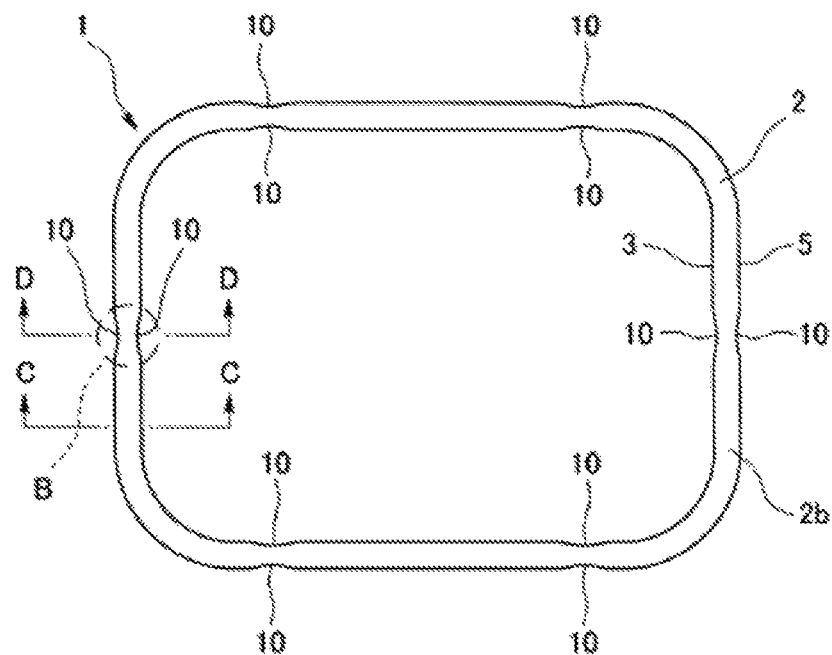
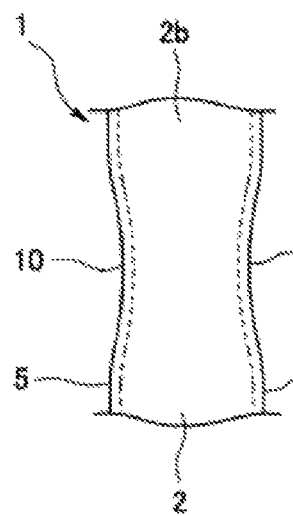
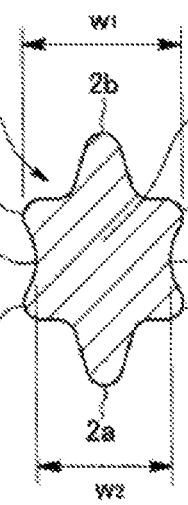
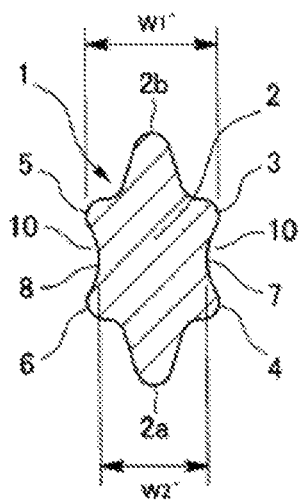

GASKET

CROSS-REFERENCE TO RELATED APPLICATIONS

This application is a U.S. National Stage Application of International Application No. PCT/JP2015/067225, filed on Jun. 16, 2015, and published in Japanese as WO 2016/006393 A1 on Jan. 14, 2016. This application claims priority to Japanese Application No. 2014-139554, filed on Jul. 7, 2014. The entire disclosures of the above applications are incorporated herein by reference.

BACKGROUND OF THE INVENTION

Field of the Invention

The present invention relates to a gasket which is a kind of a sealing device according to a sealing technology. The gasket according to the present invention is used, for example, as a gasket for a power control unit such as an inverter.

Description of the Conventional Art

A case of the power control unit such as the inverter which is, for example, used in an electric vehicle is frequently molded by a press molding or a cast molding (an aluminum die casting). In this case, a dimensional tolerance is great in an installation groove which installs the gasket, and a lid side, and there may accordingly be an obstacle in a sealing performance achieved by the gasket.

Consequently, in recent years, there has been proposed a gasket 51 which is installed to an installation groove 63 provided in one member 61 of two members 61 and 62 facing to each other and comes into close contact with the other member 62, wherein the gasket 51 is provided in a side surface of the gasket 51 and over a whole periphery of the gasket 51 with a seal projection 52 which comes into contact with a groove side surface 63b of the installation groove 63 Japanese Unexamined Patent Publication No. 2013-40673 (FIG. 3), as shown in FIG. 4.

SUMMARY OF THE INVENTION

Problem to be Solved by the Invention

However, in the gasket 51 mentioned above, since the seal projection 52 comes into contact with the groove side surface 63b of the installation groove 63 over a whole periphery thereof, air is sealed in a space A between the gasket 51 and a groove bottom surface 63a when the gasket 51 is installed to the installation groove 63. Therefore, there tends to be generated such problems that a pressing resistance at a time of installing the gasket is enlarged, and the gasket 51 floats up from the installation groove 63 due to a spring back of the sealed air.

The present invention is made by taking the above points into consideration, and an object of the present invention is to provide a gasket in which the air is hard to be sealed in the space between the gasket and the groove bottom surface when the gasket is installed to the installation groove, thereby preventing the pressing resistance at a time of installing the gasket from being enlarged, and preventing the gasket from floating up from the installation groove due to the spring back of the sealed air.

Means for Solving the Problem

In order to achieve the object mentioned above, a gasket according to a first aspect of the present invention is a gasket which is installed to an installation groove provided in one member of two members facing to each other and comes into close contact with the other member, the gasket having a seal projection which comes into contact with a groove side surface of the installation groove, the seal projection being provided over a whole periphery of the gasket in a side surface of the gasket, wherein a concavity is provided in a part on a circumference of the gasket in the side surface of the gasket, the concavity being provided for venting air when the gasket is installed to the installation groove.

Further, a gasket according to a second aspect of the present invention is the gasket described in the first aspect mentioned above, wherein the concavity is formed into a shape having a predetermined curvature in a longitudinal direction of the gasket.

Further, a gasket according to a third aspect of the present invention is the gasket described in the first or second aspect mentioned above, wherein the seal projection is provided on each of an inner peripheral surface and an outer peripheral surface of the gasket, and the concavity is provided on each of the inner peripheral surface and the outer peripheral surface of the gasket in correspondence to the seal projection.

Furthermore, a gasket according to a fourth aspect of the present invention is the gasket described in the third aspect mentioned above, wherein a plurality of the seal projections are provided on the inner peripheral surface and the outer peripheral surface of the gasket and are formed into a mutually facing trough portions between the adjacent seal projections, and the concavity is provided in such a manner as to satisfy a relationship $w_1 \geq w_0 > w_1'$, and $w_0 > w_2 > w_2'$, in which $w_1$ is a width between a leading end portion of the inner peripheral side seal projection and a leading end portion of the outer peripheral seal projection at a gasket circumferential position where the concavity is not provided, $w_2$ is a width between a root portion of the inner peripheral side trough portion and a root portion of the outer peripheral side trough portion, $w_1'$ is a width between the leading end portion of the inner peripheral side seal projection and the leading end portion of the outer peripheral side seal projection at a gasket circumferential position where the concavity is provided, $w_2'$ is a width between the root portion of the inner peripheral side trough portion and the root portion of the outer peripheral side trough portion, and $w_0$ is a groove width of the installation groove.

In the gasket according to the present invention which is provided with the structure mentioned above, the concavity is provided in the part on the circumference of the gasket in the side surface of the gasket, and the concavity vents air when the gasket is installed to the installation groove. Therefore, the air between the gasket and the groove bottom surface is discharged out of the concavity.

Although the shape of the concavity is not particularly limited, there is fear that the formation of the concavity affects an installation attitude of the seal projection since the seal projection is provided on the side surface of the gasket in conjunction with the concavity. In order to devise the fear, the concavity is preferably formed into the shape having the predetermined curvature in the longitudinal direction (the peripheral direction) of the gasket. A change of a compression stress applied to the seal projection is uniformized by applying the curvature as mentioned above, so that it is possible to inhibit disorder from being generated in the installation attitude. The concavity is formed into a smooth circular arc outer appearance since the concavity has the curvature in the longitudinal direction of the gasket, and the circular arc outer appearance is viewed as a part of a gasket planar shape when the gasket is seen from one side in a height direction thereof.

The seal projection may be provided on each of the inner peripheral surface and the outer peripheral surface of the gasket. In this case, the concavity is also provided on each of the inner peripheral surface and the outer peripheral surface of the gasket in correspondence thereto.

Further, a plurality of seal projections may be provided on each of the inner peripheral surface and the outer peripheral surface of the gasket. In this case, the concavity may be considered to be formed into the following shape. The mutually facing trough portion is formed between the seal projections which are adjacent to each other.

More specifically, the relationship $w_1 \geq w_0 > w_1'$, and $w_0 > w_2 > w_2'$ is satisfied, in which $w_1$ is the width between the leading end portion of the inner peripheral side seal projection and the leading end portion of the outer peripheral side seal projection at the gasket circumferential position where the concavity is not provided, $w_2$ is the width between the root portion of the inner peripheral side trough portion and the root portion of the outer peripheral side trough portion, $w_1'$ is the width between the leading end portion of the inner peripheral side seal projection and the leading end portion of the outer peripheral side seal projection at the gasket circumferential position where the concavity is provided, $w_2'$ is the width between the root portion of the inner peripheral side trough portion and the root portion of the outer peripheral side trough portion, and $w_0$ is the groove width of the installation groove. In this structure, since the concavity depresses the trough portion between the seal projections in the part on the circumference as well as depressing the seal projection in the part on the circumference, the gasket is formed into such a shape as to be narrowed in a groove width direction in the part on the circumference as a whole thereof. Therefore, it is possible to further stabilize the installation attitude of the seal projection.

Effect of the Invention

The present invention achieves the following effects.

More specifically, in the present invention, since the air is discharged by the concavity as described above, the air is not sealed between the gasket and the groove bottom surface when the gasket is installed to the installation groove. Therefore, it is possible to prevent the pressing resistance at a time of installing the gasket from being enlarged due to the sealed air, and prevent the gasket from floating up from the installation groove due to the spring back of the sealed air. Further, the installation attitude of the seal projection can be stabilized by defining the shape of the concavity.

BRIEF EXPLANATION OF THE DRAWINGS

FIGS. 1A, 1B, 1C and 1D are views showing a gasket according to an embodiment of the present invention, in which FIG. 1A is a plan view of the gasket, FIG. 1B is a partly enlarged plan view of the gasket and shows a portion B in FIG. 1A in an enlarged manner, FIG. 1C is a partly enlarged cross sectional view of the gasket and shows a cross section along a line C-C in FIG. 1A in an enlarged manner, and FIG. 1D is a partly enlarged cross sectional view of the gasket and shows a cross section along a line D-D in FIG. 1A in an enlarged manner;

DETAILED DESCRIPTION OF PREFERRED EMBODIMENTS

The following embodiments are included in the present invention.

(1) An air vent is provided in a part of the gasket, the air vent having a width of a side face projection (a seal projection) which is made smaller than the groove width. The air vent is preferably structured such that the width of the side face projection is depressed with a curvature between R3 and R20 in the longitudinal direction of the gasket, more preferably with a curvature between R5 and R15. The change of the compression stress applied to the side face projection is uniform by the provision of the curvature, and it is possible to suppress the disorder of the installation attitude at a position of the air vent.

(2) It is possible to suppress the sealing of the air at a time of installing the gasket by the provision of the air vent in the present gasket, and an installing workability is improved.

EMBODIMENTS

Next, a description will be given of embodiments according to the present invention with reference to the accompanying drawings.

Figure 2:
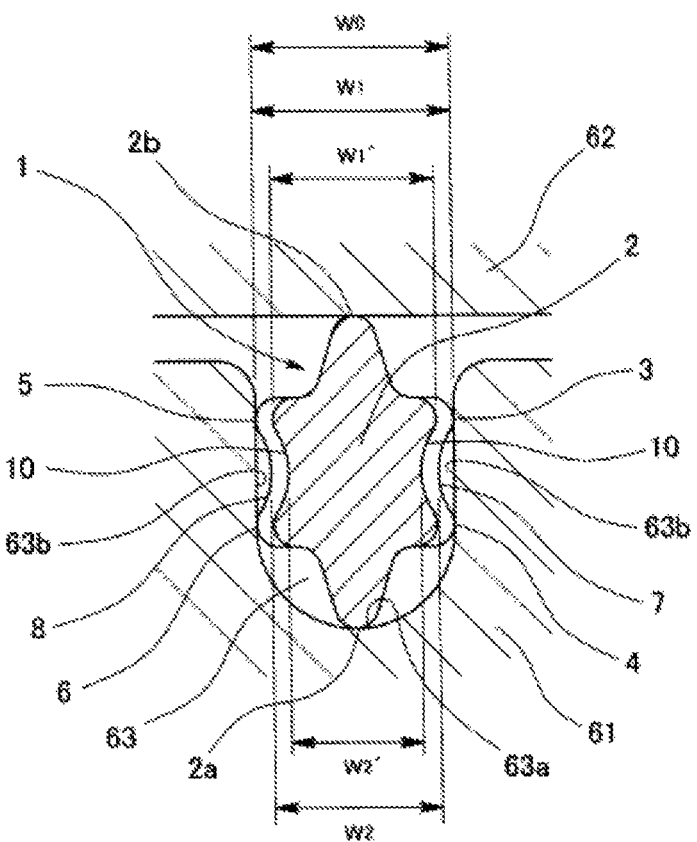
FIG. 2 is a cross sectional view of a substantial part and shows an installed state of the gasket.

FIGS. 1 and 2 show a gasket according to an embodiment of the present invention. The gasket 1 according to the embodiment is structured such as to be installed to an installation groove 63 which is provided in one member (for example, a case of a power control unit such as an inverter) 61 of two members facing to each other, and come into close contact with the other member (for example, a case lid of the power control unit such as the inverter) 62, and is constructed as follows.

More specifically, the gasket 1 is molded by a predetermined rubber-like elastic material, and is formed into an approximately rectangular frame in its planar shape as shown in FIG. 1A.

Further, the gasket 1 is provided with a gasket main body portion (a gasket base portion) 2 in which one end (a lower end) 2a in its height direction (a vertical direction) comes into close contact with a groove bottom surface 63a of the installation groove 63 in an installed state, and the other end (an upper end) 2b in the height direction comes into close contact with the other member 62, as shown in FIG. 2. A first seal projection 3 and a second seal projection 4 coming into close contact with a groove side surface 63b of the installation groove 63 in the installed state are provided side by side in the gasket height direction on an inner peripheral surface in a side surface of the gasket main body portion 2, and a third seal projection 5 and a fourth seal projection 6 coming into close contact with a groove side surface 63b in an opposite side of the installation groove 63 in the installed state are provided side by side in the gasket height direction in the same manner on an outer peripheral surface in the side surface of the gasket main body portion 2. Each of the seal projections 3, 4, 5 and 6 is provided over a whole periphery of the gasket 1. Further, a relatively depressed trough portion 7 is provided between the first and second seal projections 3 and 4, a relatively depressed trough portion 8 is provided between the third and fourth projections 5 and 6, and these trough portions 7 and 8 are also provided over a whole periphery of the gasket 1.

The gasket main body portion 2 is formed into a shape which is symmetrical in a gasket width direction (a lateral direction), and the first seal projection 3 in the inner peripheral side and the third seal projection 5 in the outer peripheral side, and the second seal projection 4 in the inner peripheral side and the fourth seal projection 6 in the outer peripheral side respectively form pairs and are respectively formed into the shapes which are symmetrical in the gasket width direction. As a result, the gasket 1 is formed into a shape which is symmetrical in the gasket width direction as a whole. However, they are not necessarily formed into the symmetrical shapes.

Since each of the one end 2a and the other end 2b of the gasket main body portion 2 is formed into a lip shape, the gasket main body portion 2 is formed into a rectangular cross sectional shape, a first end face coming into close contact with the groove bottom surface 63a of the installation groove 63 is integrally formed in one end surface (a lower end surface) in the height direction of the gasket main body portion 2, and a second end face lip coming into close contact with the other member 62 is integrally formed in the other end surface (an upper end surface) in the height direction, on the assumption that these ends are a different constituting element from the gasket main body 2.

A concavity 10 is provided in a part on a circumference of the gasket in the side surface of the gasket 1 for providing an air vent when the gasket 1 is installed to the installation groove 63. Since the seal projections 3, 4, 5 and 6 are respectively provided on the inner peripheral surface and the outer peripheral surface of the gasket as mentioned above in the embodiment, the concavity 10 is provided on each of the inner peripheral surface and the outer peripheral surface of the gasket 1 in correspondence thereto, and the concavity 10 in the inner peripheral side and the concavity 10 in the outer peripheral side are provided so that their circumferential positions coincide with each other. Further, as shown in FIG. 1A, the concavities 10 are provided at about six positions in a linear portion of the gasket 1 which is formed into a rectangular flat surface.

As one position of the concavity 10 is shown in FIG. 1B in an enlarged manner, each of the concavities 10 is formed into a shape which has a predetermined curvature in a gasket longitudinal direction, that is, formed into a curved shape so as to be connected smoothly to a linear portion. A magnitude of the curvature is preferably set between R3 and R20, and further preferably set between R5 and R15. Since a change of a compression stress applied to the seal projections 3, 4, 5 and 6 is uniform by applying the curvature to the concavity 10 as mentioned above, it is possible to suppress disorder of an installation attitude at a position where the air is vented. If the curvature is smaller, the air can not be smoothly vented at a time of installing. On the other hand, if the curvature is too large, the close contact between the seal projections 3, 4, 5 and 6 and the groove side surface is deteriorated at more positions, and this structure is not preferable.

Further, the concavity 10 is provided in such a manner as to satisfy the following relationships:

$$w_1 \geq w_0 > w_1' \quad (a)$$

$$w_0 > w_2 > w_2' \quad (b)$$

in which $w_1$ is a width between leading end portions of the first and second seal projections 3 and 4 in the inner peripheral side and leading end portions of the third and fourth seal projections 5 and 6 in the outer peripheral side at a gasket circumferential position where the concavity 10 is not provided, $w_2$ is a width between a root portion of the inner peripheral side trough portion 7 and a root portion of the outer peripheral side trough portion 8, $w_1'$ is a width between the leading end portions of the first and second seal projections 3 and 4 in the inner peripheral side and the leading end portion of the third and fourth seal projections 5 and 6 in the outer peripheral side at a gasket circumferential position where the concavity 10 is provided, $w_2'$ is a width between the root portion of the inner peripheral side trough portion 7 and the root portion of the outer peripheral side trough portion 8, and $w_0$ is a groove width of the installation groove.

In the gasket 1 having the structure mentioned above, the concavity 10 is provided in a part on the circumference of the gasket 1 in the side surface of the gasket 1, and the concavity 10 vents air when the gasket 1 is installed to the installation groove 63. As a result, it is possible to discharge the air between the gasket 1 and the groove bottom surface 63a out of the concavity 10 when the gasket 1 is installed to the installation groove 63. Therefore, the air is not sealed between the gasket 1 and the groove bottom surface 63a when the gasket 1 is installed to the installation groove 63. As a result, it is possible to prevent the pressing resistance at a time of installing the gasket from being enlarged due to the sealed air, and prevent the gasket 1 from floating up from the installation groove 63 due to the spring back of the sealed air.

Further, since the concavity 10 is formed into the shape which has the predetermined curvature in the gasket longitudinal direction and is provided so as to satisfy the expressions (a) and (b) mentioned above in the gasket width direction, it is possible to stabilize the installation attitude of the seal projections 3, 4, 5 and 6, and further stabilize the installation attitude as a whole of the gasket 1.

The concavities 10 which are adjacent to each other in the gasket longitudinal direction are preferably arranged at intervals between 20 and 80 mm, and further preferably arranged at intervals between 30 and 60 mm. If the intervals between the concavities 10 are smaller, the close contact between the seal projections 3, 4, 5 and 6 and the groove side surface 63b is deteriorated at more positions, and this structure is not preferable. On the other hand, the intervals are larger, the air can not be smoothly vented at a time of installing.

Figure 3A:
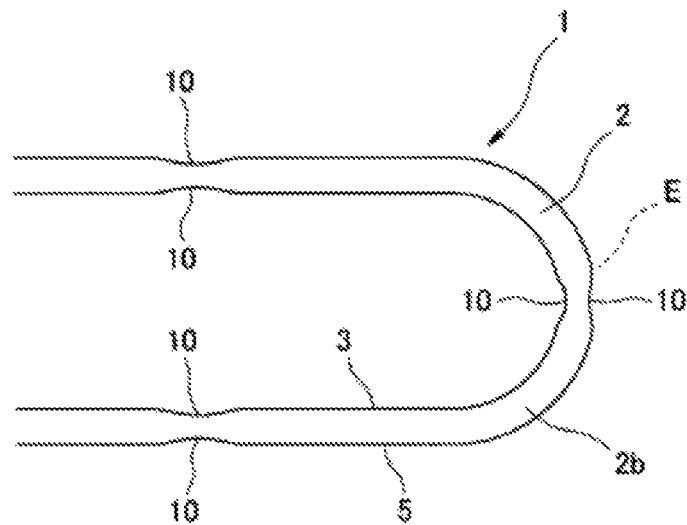
FIGS. 3A and 3B are partly plan views of a gasket according to the other embodiment of the present invention.

Further, in the embodiment mentioned above, the concavity 10 is provided in the linear portion of the gasket 1, however, the concavity 10 may be provided in the curved portion of the gasket 1. In this case, as shown by a portion E in FIG. 3A, it is preferable for stabilizing the installation attitude of the gasket 1 to set the curvature of the concavity 10 in the inner peripheral side smaller than the curvature of the concavity 10 in the outer peripheral side.

Figure 3B:
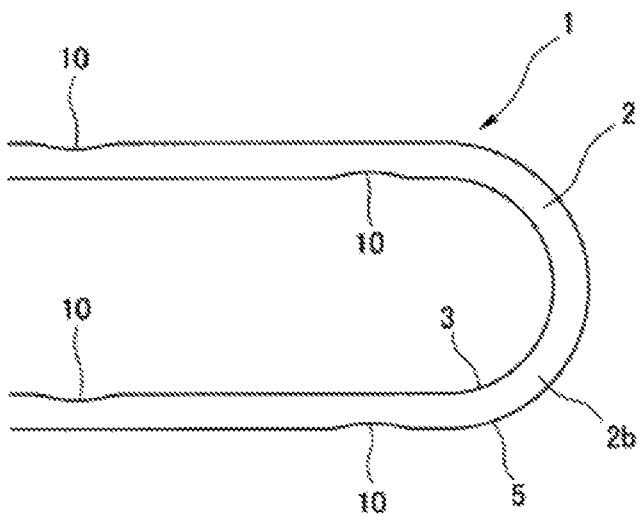
Figure 4:
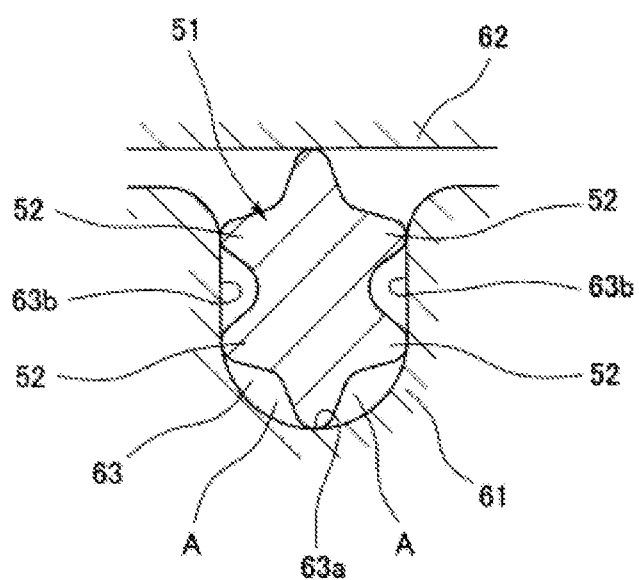
FIG. 4 is a cross sectional view of a substantial part and shows an installed state of a gasket according to the prior art.

Further, as shown in FIG. 3B, the concavity 10 in the inner peripheral side and the concavity 10 in the outer peripheral side may be deviated from each other in the gasket longitudinal direction.

Further, since the air within the installation groove 63 is discharged (extruded) little by little to the external portion of the installation groove 63 from the concavity 10 in the course of installing the gasket 1 to the installation groove 63, the concavity 10 may be structured such as to be no longer in use and be closed at a time point that the gasket 1 is finally installed to the installation groove 63. Therefore, in this case, the seal projections 3 and 5 come into contact with the groove side surface 63b of the installation groove 63 with the leading end portions of the seal projections 3 and 5 at the gasket circumferential position where the concavity 10 is not provided, and also come into contact with the groove side surface 63b of the installation groove 63 even with the leading end portions of the seal projections 3 and 5 at the gasket circumferential position where the concavity 10 is provided, that is, the seal projections 3 and 5 come into contact with the groove side surface 63b of the installation groove 63 over the whole periphery of the seal projections 3 and 5, in a state in which the gasket 1 is installed to the installation groove 63 and is compressed in the groove width direction. Therefore, according to the structure mentioned above, since the seal projections 3 and 5 come into contact with the groove side surface 63b of the installation groove 63 over the whole periphery, the air within the installation groove 63 can be discharged without deteriorating the installation stability of the gasket 1 and the contact stability of the gasket seal surface.

What is claimed is:

1. A gasket which is installed to an installation groove provided in one member of two members facing to each other and comes into close contact with the other member, the gasket comprising:
    a seal projection which comes into contact with a groove side surface of said installation groove, the seal projection being provided over a whole periphery of said gasket in a side surface of said gasket,
    wherein a concavity is provided in a part on a circumference of said gasket in the side surface of said gasket, the concavity being provided for venting air when said gasket is installed to said installation groove,
    wherein said seal projection is provided on each of an inner peripheral surface and an outer peripheral surface of said gasket, and said concavity is provided on each of the inner peripheral surface and the outer peripheral surface of said gasket in correspondence to the seal projection,
    wherein a plurality of said seal projections are provided on the inner peripheral surface and the outer peripheral surface of said gasket and are formed into a mutually facing trough portions between the adjacent seal projections, and
    wherein said concavity is provided in such a manner as to satisfy a relationship $w_1 \geq w_0 > w_1'$ and $w_0 > w_2 > w_2'$, in which $w_1$ is a width between a leading end portion of the inner peripheral side seal projection and a leading end portion of the outer peripheral seal projection at a gasket circumferential position where said concavity is not provided, $w_2$ is a width between a root portion of the inner peripheral side trough portion and a root portion of the outer peripheral side trough portion, $w_1'$ is a width between the leading end portion of the inner peripheral side seal projection and the leading end portion of the outer peripheral side seal projection at a gasket circumferential position where said concavity is provided, $w_2'$ is a width between the root portion of the inner peripheral side trough portion and the root portion of the outer peripheral side trough portion, and $w_0$ is a groove width of said installation groove.

2. The gasket according to claim 1, wherein said concavity is formed into a shape having a predetermined curvature in a longitudinal direction of said gasket.

* * * * *